(12) United States Patent
Shoshi et al.

(10) Patent No.: US 7,119,959 B2
(45) Date of Patent: Oct. 10, 2006

(54) OPTICAL FILM

(75) Inventors: Satoru Shoshi, Koshigaya (JP); Yutaka Onozawa, Kawagoe (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 10/549,044

(22) PCT Filed: Mar. 28, 2004

(86) PCT No.: PCT/JP2004/004361

§ 371 (c)(1),
(2), (4) Date: Sep. 12, 2005

(87) PCT Pub. No.: WO2004/088364

PCT Pub. Date: Oct. 14, 2004

(65) Prior Publication Data

US 2006/0171034 A1 Aug. 3, 2006

(30) Foreign Application Priority Data

Mar. 31, 2003 (JP) .............................. 2003-093660

(51) Int. Cl.
*G02B 1/10* (2006.01)
(52) U.S. Cl. ..................... 359/585; 359/580; 359/586
(58) Field of Classification Search ................ 359/580, 359/585, 586, 588, 601
See application file for complete search history.

(56) References Cited

U.S. PATENT DOCUMENTS

| | | | |
|---|---|---|---|
| 6,841,272 B1 | 1/2005 | Shoshi et al. | |
| 6,859,322 B1 | 2/2005 | Shoshi et al. | |
| 6,916,540 B1 * | 7/2005 | Nishikawa et al. | 428/423.9 |
| 2002/0187324 A1 | 12/2002 | Shoshi et al. | |
| 2002/0197485 A1 | 12/2002 | Nishikawa et al. | |

FOREIGN PATENT DOCUMENTS

| | | |
|---|---|---|
| JP | 7-48117 A | 2/1995 |
| JP | 2002-71905 A | 3/2002 |
| JP | 2002-341103 A | 11/2002 |
| JP | 2002-355936 A | 12/2002 |

* cited by examiner

*Primary Examiner*—Leonidas Boutsikaris
(74) *Attorney, Agent, or Firm*—Frishauf, Holtz, Goodman & Chick, P.C.

(57) ABSTRACT

A film for optical applications which effectively prevents reflection of light on the surface of image display devices such as PDP, CRT and LCD, exhibits excellent scratch resistance and transmission of light, provides excellent adhesion between layers and can be produced at a low cost is disclosed. The film comprises (A) a high refractivity hard coat layer (the refractive index: 1.60 to 1.75, the thickness: 2 to 20 μm) comprising (a) an antimony-doped tin oxide having a needle shape (the average particle diameter along the major axis: 0.05 to 10 μm, the average aspect ratio: 3 to 100), (b) at least one other metal oxide and (c) a material cured with an ionizing radiation and (B) a low refractivity layer (the refractive index: 1.30 to 1.45, the thickness: 40 to 200 nm), which are successively laminated at least on one face of a substrate film.

9 Claims, No Drawings

OPTICAL FILM

This application is the United States national phase application of International Application PCT/JP2004/004361 filed Mar. 26, 2004.

TECHNICAL FIELD

The present invention relates to a film for optical applications and, more particularly, to a film for optical applications which effectively prevents reflection of light at the surface of image display devices such as plasma displays (PDP), cathode ray tubes (CRT) and liquid crystal displays (LCD), exhibits excellent scratch resistance and transmission of light, has a simple layer structure and can be produced at a low cost.

BACKGROUND ART

When a display device such as PDP, CRT and LCD is used, light from the outside is occasionally reflected at the surface of the display and difficulty arises in watching images on the display. In particular, as the size of flat panel displays increases recently, solving the above problem is becoming more important.

To solve the above problem, various antireflection treatments and anti-glare treatments have been made on various display devices. As one of such treatments, an antireflection film is used for various display devices.

The antireflection film has heretofore been prepared in accordance with a dry process such as vapor deposition and sputtering. A thin film of a substance having a low refractive index such as MgF is formed on a substrate film, or layers of a substance having a great refractive index such as ITO (indium oxide doped with tin) and $TiO_2$ and layers of a substance having a small refractive index such as MgF and SiO are alternately laminated. However, the antireflection prepared in accordance with the dry process has a drawback in that the cost of production is high.

Recently, preparation of an antireflection film in accordance with a wet process, i.e., a coating process, has been attempted. However, the antireflection film prepared in accordance with the wet process has a drawback in that scratch resistance of the surface of the prepared film is inferior to that of the film prepared in accordance with the dry process.

The present inventors conducted intensive studies to overcome the above problems, and a film for optical applications comprising a hard coat layer which comprises a resin cured by an ionizing radiation and has a thickness in a range of 2 to 20 μm, a high refractivity layer which comprises a resin cured by an ionizing radiation and at least two metal oxides comprising an antimony-doped tin oxide (ATO) and has a refractive index in the range of 1.65 to 1.80 and a thickness in the range of 60 to 160 nm and a low refractivity layer which comprises a siloxane-based polymer and has a refractive index in the range of 1.37 to 1.47 and a thickness in the range of 80 to 180 nm, layers (A) to (C) being laminated at least on one face of a substrate film successively from the side of the substrate film, has been applied to the patent (Patent Reference 1).

In the film for optical applications having the structure described above, it is desired that the high refractivity layer has a great transmittance of light and exhibits excellent adhesion with the siloxane-based polymer in the low refractivity layer formed on the high refractivity layer. In the film for optical applications described in Patent Reference 1, the high refractivity layer exhibits excellent adhesion with the siloxane-based polymer since the layer comprises ATO. However, a problem arises in that the transmission of light decreases when the thickness of the high refractivity layer is increased while the excellent adhesion is maintained since ATO is in the form of spherical particles and, occasionally, the adhesion and the light transmission are not sufficiently satisfied simultaneously.

Antimony pentaoxide, which is a metal oxide, exhibits excellent adhesion with siloxane-based polymers. However, since antimony pentaoxide does not have a great refractivity, a problem arises in that the refractive index of the high refractivity layer does not reach the desired value although the adhesion is improved when antimony pentaoxide is comprised in a great amount.

In the film for optical applications having the above structure, it is advantageous that the low refractivity layer comprising the siloxane-based polymer comprises porous silica so that the refractive index is decreased. In this case, it is necessary for practical applications that an antifouling layer be formed on the low refractivity layer. Therefore, when the antifouling property can be provided to the low refractivity layer comprising porous silica and a siloxane-based polymer and the formation of the antifouling layer is not necessary, the efficiency of production can be improved, and the economic advantage can be obtained.

[Patent Reference 1]

Japanese Patent Application Laid-Open No. 2002-341103

Under the above circumstances, the present invention has an object of providing a film for optical applications which effectively prevents reflection of light on the surface of image display devices such as PDP, CRT and LCD, exhibits excellent scratch resistance and transmission of light, provides excellent adhesion between layers and can be produced at a low cost.

DISCLOSURE OF THE INVENTION

As the result of intensive studies by the present inventors to develop the film for optical applications exhibiting the above excellent properties, it was found that a film for optical applications exhibiting the above excellent properties could be obtained by successively laminating a high refractivity hard coat layer which comprised ATO having a needle shape having a specific shape and other metal oxides and had a specific refractive index and a specific thickness and a low refractivity layer having a specific refractive index and a specific thickness on a substrate film in accordance with a wet process.

It was also found that the prescribed low refractive index could be easily obtained and the antifouling property could be provided to the low refractivity layer to eliminate the necessity for forming an antifouling layer separately when the low refractivity layer comprised porous silica and a siloxane-based block copolymer and a silicone-based block copolymer was further added to the low refractivity layer.

The present invention has been completed based on the knowledge.

The present invention provides:

(1) A film for optical applications comprising (A) a high refractivity hard coat layer which comprises (a) an antimony-doped tin oxide having a needle shape having an average particle diameter along a major axis of 0.05 to 10 μm and an average aspect ratio of 3 to 100, (b) at least one other metal oxide and (c) a material cured with an ionizing radiation and has a refractive index in a range of 1.60 to 1.75 and a thickness in a range of 2 to 20 μm and (B) a low refractivity layer which has a refractive index in a range of 1.30 to 1.45 and a thickness in a range of 40 to 200 nm, layers (A) and (B) being successively laminated at least on one face of a substrate film;

(2) A film for optical applications described in (1), wherein the other metal oxide of component (b) in layer (A) is at least one metal oxide selected from zirconium oxide, zinc antimonate and antimony pentaoxide;

(3) A film for optical applications described in any one of (1) and (2), wherein a content of entire metal oxides in layer (A) is 50 to 80% by weight, and a ratio of an amount by weight of component (a) to an amount by weight of component (b) is 4:1 to 1:3;

(4) A film for optical applications described in any one of (1) to (3), wherein layer (B) comprises porous silica and a siloxane-based polymer;

(5) A film for optical applications described in (4), wherein layer (B) further comprises a silicone-based block copolymer;

(6) A film for optical applications described in any one of (4) and (5), wherein the porous silica in layer (B) has a specific gravity of 1.7 to 1.9, a refractive index of 1.30 to 1.36 and an average particle diameter of 20 to 100 nm;

(7) A film for optical applications described in any one of (5) and (6), wherein a content of the silicone-based block copolymer in layer (B) is 2 to 50% by weight;

(8) A film for optical applications described in any one of (1) to (7), wherein the hard coat layer of layer (A) is a hard coat layer having an antiglare property; and (9) A film for optical applications described in any one of (1) to (8), wherein the low refractivity layer of layer (B) has an antistatic property

THE MOST PREFERRED EMBODIMENT TO CARRY OUT THE INVENTION

The film for optical applications of the present invention is an antireflection film having a structure comprising (A) a high refractivity hard coat layer and (B) a low refractivity layer which are successively laminated at least on one face of a substrate film in accordance with a wet process.

The substrate film used for the film for optical applications of the present invention is not particularly limited and can be suitably selected from conventional plastic films heretofore used as the substrate for antireflection films in optical applications. Examples of the plastic film include films of polyesters such as polyethylene terephthalate, polybutylene terephthalate and polyethylene naphthalate, polyethylene films, polypropylene films, cellophane, diacetylcellulose films, triacetylcellulose films, acetylcellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyether imide films, polyimide films, fluororesin films, polyamide films and acrylic resin films.

The substrate film may be transparent or translucent and may be colored or colorless. These properties of the substrate film can be suitably selected in accordance with the application. For example, when the film is used as a protective film of a liquid crystal display, a colorless transparent film is preferable as the substrate film.

The thickness of the substrate film is not particularly limited and general, in the range of 15 to 250 μm and preferably in the range of 30 to 200 μm. One or both surfaces of the substrate film may be treated, for example, by oxidation or by a treatment of forming rough surfaces, where desired, so that adhesion with a layer disposed on the surfaces is enhanced. Examples of the treatment of the surface by oxidation include the treatment by corona discharge, the treatment by chromic acid (a wet process), the treatment by flame, the treatment by the heated air and the irradiation with ultraviolet light in the presence of ozone. Examples of the treatment of forming rough surfaces include the treatment by sand blasting and the treatment with a solvent. The surface treatment is suitably selected in accordance with the type of the substrate film. In general, the treatment by corona discharge is preferable from the standpoint of the effect and the operability. The substrate film may be treated by forming a primer on one or both faces thereof.

In the film for optical applications of the present invention, first, (A) the high refractivity hard coat layer comprising (a) an antimony-doped tin oxide having a needle shape, (b) at least one other metal oxide and (c) a material cured with an ionizing radiation is formed on at least one face of the substrate film.

In the present invention, an antimony-doped tin oxide (ATO) having a shape having an average particle diameter along the major axis in the range of 0.05 to 10 μm and an average aspect ratio in the range of 3 to 100 is used as ATO having a needle shape of component (a). The excellent adhesion with the siloxane-based polymer in the low refractivity layer formed on the hard coat layer can be obtained by the use of ATO having a needle shape having the above shape even when the content of ATO in the hard coat layer is small since hydroxyl group in ATO works effectively at the surface of the hard coat layer. Moreover, the transmittance of light of the hard coat layer is great due to the small content. The hard coat layer exhibiting a great transmittance of light, a great hardness and a great refractive index and providing excellent adhesion with the low refractivity layer formed on the hard coat layer can be obtained by the combined use of ATO having a needle shape and the metal oxide of component (b).

It is preferable that ATO having a needle shape has a shape such that the average particle diameter along the major axis is in the range of 0.1 to 5.0 μm and the average aspect ration is in the range of 5 to 60. It is more preferable that the average particle diameter along the major axis is in the range of 0.15 to 3.5 μm and the average aspect ration is in the range of 10 to 40. The average particle diameter along the minor axis is, in general, about 0.01 to 0.2 μm.

ATO having a needle shape can be obtained in accordance with a conventional process. For example, ATO having a needle shape can be obtained by incinerating a substance for incineration comprising a tin component, an antimony component and a boron compound at a temperature of about 700 to 1,200° C., followed by removing soluble salts in the product of incineration.

The average particle diameter along the major axis, the average particle diameter along the minor axis and the average aspect ratio are obtained in accordance with the following method.

From images of the particles obtained by a transmission electron microscope, 300 particles are arbitrarily selected. The dimensions along the major axis and the minor axis of each particle are measured, and the average particle diameters are calculated based on the obtained results. Using the obtained values, the average particle diameter along the major axis/the average particle diameter along the minor axis (the average aspect ratio) is obtained.

As the other metal oxide of component (b), a metal oxide providing a great refractive index to the hard coat layer is preferable. As the metal oxide, for example, zirconium oxide, zinc antimonate and antimony pentaoxide can be used. The other metal oxide may be used singly or in combination of two or more.

It is preferable that the high refractivity hard coat layer of layer (A) has the antiglare property. The antiglare property can be provided by adding particles of a metal oxide or particles of an organic substance to the high refractivity hard coat layer. It is preferable that particles of a metal oxide is used. As the particles of a metal oxide for providing the antiglare property, particles of a metal oxide suitably selected from metals oxides conventionally used for providing the antiglare property can be used. Examples of the metal oxide include silica gel particles having an average diameter of about 0.5 to 10 μm and aggregates of colloidal silica gel particles with an amine compound having an average particle diameter of about 0.5 to 10 μm. However, it is important that the particles of a metal oxide is added in an amount which does not adversely affect the refractive index of the high refractivity hard coat layer since the refractive index is decreased by the addition of the particles of a metal oxide.

The content of the entire metal oxides in the high refractivity hard coat layer is suitably selected considering the antiglare property, the antireflection property and the scratch resistance of the obtained film for optical applications. The content is, in general, in the range of 50 to 80% by weight and preferably in the range of 60 to 75% by weight. It is preferable that the ratio of the amount by weight of component (a) and the amount by weight of component (b) is in the range of 4:1 to 1:3 and more preferably in the range of 3:1 to 1:1 when the transmittance of light and the refractive index of the hard coat layer and the adhesion with the low refractivity layer of layer (B) formed on layer (A) are considered.

The high refractivity hard coat layer of layer (A) in the present invention comprises ATO having a needle shape of component (a), the other metal oxide of component (b) and a material cured with an ionizing radiation and can be formed, for example, by coating at least one face of the substrate with a coating fluid for forming a hard coat layer which comprises a compound curable with an ionizing radiation, components (a) and (b) described above and, where desired, a photopolymerization initiator to form a coating layer, followed by curing the formed coating layer.

Examples of the above compound curable by an ionizing radiation include photopolymerizable prepolymers and/or photopolymerizable monomers. The photopolymerizable prepolymer include prepolymers of the radical polymerization type and prepolymers of the cationic polymerization type. Examples of the prepolymer of the radical polymerization type include prepolymers of polyester acrylates, prepolymers of epoxyacrylates, prepolymers of urethane acrylates and prepolymers of polyol acrylates. The prepolymer of a polyester acrylate can be obtained, for example, by obtaining a polyester oligomer having hydroxyl groups at both ends by condensation of a polyfunctional carboxylic acid with a polyhydric alcohol, followed by esterification of the hydroxyl groups in the obtained oligomer with (meth) acrylic acid; or by obtaining an oligomer having hydroxyl groups at both ends by addition of an alkylene oxide to a polyfunctional carboxylic acid, followed by esterification of the hydroxyl groups of the obtained oligomer with (meth) acrylic acid. The prepolymer of an epoxyacrylate can be obtained, for example, by esterification of oxirane rings in an epoxy resin of a bisphenol type or a novolak type having a relatively low molecular weight by the reaction with (meth)acrylic acid. The prepolymer of a urethane acrylate can be obtained, for example, by obtaining a polyurethane oligomer by the reaction of a polyether polyol or a polyester polyol with a polyisocyanate, followed by esterification of the obtained oligomer with (meth)acrylic acid. The prepolymer of polyol acrylate can be obtained, for example, by esterification of hydroxyl groups in a polyether polyol with (meth)acrylic acid. The above photopolymerizable prepolymer may be used singly or in combination of two or more.

As the photopolymerizable prepolymer of the cationic polymerization type, in general, epoxy resins are used. Examples of the epoxy resin include compounds obtained by epoxidation of polyhydric phenols such as bisphenol resins and novolak resins with epichlorohydrin and compounds obtained by oxidation of linear olefin compounds and cyclic olefin compounds with peroxides.

Examples of the photopolymerizable monomer include polyfunctional acrylates such as 1,4-butanediol di(meth) acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth) acrylate, dicyclopentenyl di(meth)acrylate modified with caprolactone, di(meth)acrylate of phosphoric acid modified with ethylene oxide, cyclohexyl di(meth)acrylate substituted with allyl group, isocyanurate di(meth)acrylate, trimethylolpropane tri(meth)-acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate and dipentaerythritol hexa (meth)acrylate modified with caprolactone. The above photopolymerizable monomers may be used singly or in combination of two or more. The photopolymerizable monomer may be used in combination with the photopolymerizable prepolymer described above.

Examples of the photopolymerization initiator for the photopolymerizable prepolymers and the photopolymerizable monomers of the radical polymerization type, which is used where desired, include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxy-2-propyl) ketone, benzophenone, p-phenylbenzophenone, 4,4'-diethylaminobenzophenone, dichloro-benzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylaminobenzoates. Examples of the photo-polymerization initiator for the photopolymerizable prepolymers of the cationic polymerization type include compounds composed of oniums such as aromatic sulfonium ions, aromatic oxosulfonium ions and aromatic iodonium ions and anions such as tetrafluoroborates, hexafluoro-phosphates, hexafluoroantimonates and hexafluoroarsenates. The above photopolymerization initiators may be used singly or in combination of two or more. The amount is, in general, selected in the range of 0.2 to 10 parts by weight per 100 parts by weight of the photopolymerizable prepolymer and/or the photopolymerizable monomer.

The coating fluid for forming the hard coat layer used in the present invention can be prepared by adding the above compound curable by irradiation with an ionizing radiation, components (a) and (b), the above photopolymerization initiator which is used where desired and various additives such as antioxidants, ultraviolet light absorbents, light stabilizers, leveling agents and defoaming agents in each specific amount to a suitable solvent which is used where necessary, followed by dissolving or dispersing the added components in the solvent.

Examples of the solvent used in the above preparation include aliphatic hydrocarbons such as hexane, heptane and cyclohexane, aromatic hydrocarbons such as toluene and xylene, halogenated hydrocarbons such as methylene chloride and ethylene chloride, alcohols such as methanol, ethanol, propanol and butanol, ketones such as acetone, methyl ethyl ketone, 2-pentanone and isophorone, esters such as ethyl acetate and butyl acetate and cellosolve solvents such as ethylcellosolve.

The concentration and the viscosity of the coating fluid thus prepared is not particularly limited as long as the coating fluid can be used for coating and can be suitably selected in accordance with the situation.

The prepared coating fluid is applied to at least one face of the substrate film in accordance with a conventional process such as the bar coating process, the knife coating process, the roll coating process, the blade coating process, the die coating process and the gravure coating process, and a coating film is formed. The formed coating film is dried and cured by irradiation with an ionizing radiation, and a high refractivity hard coat layer is formed.

Examples of the ionizing radiation include ultraviolet light and electron beams. The ultraviolet light can be obtained by using a high voltage mercury lamp, a fusion H lamp or a xenon lamp. The electron beams can be obtained by using an electron beam accelerator. Among these ionizing radiations, ultraviolet light is preferable. When the electron beams are used, a cured film can be obtained without adding polymerization initiators.

In the present invention, the thickness of the high refractivity hard coat layer of layer (A) is in the range of 2 to 20 μm. When the thickness is smaller than 2 μm, there is the possibility that scratch resistance of the film for optical applications is not sufficiently exhibited. When the thickness exceeds 20 μm, there is the possibility that cracks are formed in the hard coat layer. It is preferable that the thickness of the hard coat layer is in the range of 3 to 15 μm and more preferably in the range of 5 to 10 μm.

In the film for optical applications of the present invention, the refractive index of the high refractivity hard coat layer is, in general, in the range of 1.60 to 1.75. When the refractive index is smaller than 1.60, the film for optical applications exhibiting the excellent antiglare property cannot be obtained. When the refractive index exceeds 1.75, it is difficult that the hard coat layer is formed.

In the film for optical applications of the present invention, the low refractivity layer of layer (B) is formed on the high refractivity hard coat layer which has been formed as described above.

The low refractivity layer has a refractive index in the range of 1.30 to 1.45 and a thickness in the range of 40 to 200 nm. When the refractive index or the thickness is outside the above range, it is difficult that the film for optical applications exhibiting the excellent antireflection property is obtained.

It is preferable that layer (B) comprises porous silica and a siloxane-based polymer. As the porous silica, fine particles of porous silica having a specific gravity in the range of 1.7 to 1.9, a refractive index in the range of 1.30 to 1.36 and an average particle diameter in the range of 20 to 100 nm are preferable. As for the amount of the above fine particles of porous silica in layer (B), it is sufficient that the refractive index of layer (B) is within the above range, and the amount of the fine particles of porous silica in layer (B) is not particularly limited. In general, the amount by weight of the fine particles of porous silica in layer (B) is selected in the range of 1 to 2 times as much as the amount by weight of the siloxane-based polymer.

Examples of the siloxane-based polymer comprised in layer (B) include inorganic silica-based compounds (including polysilicic acid), polyorganosiloxane-based compounds and mixtures of these compounds. The inorganic silica-based compounds and the polyorganosiloxane-based compounds can be produced in accordance with conventional processes.

For example, a process of partially or completely hydrolyzing and polycondensing an alkoxysilane compound represented by general formula [1]:

$$R^1{}_n Si(OR^2)_{4-n} \qquad [1]$$

using an inorganic acid such as hydrochloric acid and sulfuric acid or an organic acid such as oxalic acid and acetic acid is preferable. In general formula [1], $R^1$ represents a group which is not hydrolyzed such as an alkyl group; a substituted alkyl group, the substituent being a halogen atom, hydroxyl group, thiol group, epoxy group or (meth) acryloyloxy group; an alkenyl group; an aryl group; and aralkyl group. $R^2$ represents a lower alkyl group, and n represents 0 or an integer of 1 to 3. A plurality of $R^1$ may represent the same group or different groups when the plurality of $R^1$ are present, and a plurality of $OR^2$ may represent the same group or different groups when the plurality of $OR^2$ are present.

When a tetraalkoxysilane, i.e., a compound represented by general formula [1] in which n represents 0, is completely hydrolyzed, inorganic silica-based compounds are obtained. When a tetraalkoxysilane is partially hydrolyzed, polyorganosiloxane-based compounds or a mixture of inorganic silica-based compounds and polyorganosiloxane-based compounds is obtained. When a compound represented by general formula [1] in which n represents 1 to 3 is partially or completely hydrolyzed, polyorganosiloxane-based compounds are obtained since such a compound has a group which is not hydrolyzed. A suitable solvent may be used for the hydrolysis so that the hydrolysis can be conducted uniformly.

Examples of the alkoxysilane compound represented by general formula [1] include tetramethoxysilane, tetraethoxysilane, tetra-n-propoxysilane, tetraisopropoxysilane, tetra-n-butoxysilane, tetra-isobutoxysilane, tetra-sec-butoxysilane, tetra-tert-butoxysilane, methyltrimethoxysilane, methytriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, γ-glycidoxypropyltrimethoxysilane, γ-acryloyloxy-propyltrimethoxysilane, γ-methacryloyloxypropyltrimethoxysilane, dimethyldimethoxysilane, methylphenyldimethoxysilane, vinyltrimethoxysilane, vinyltriethoxysilane, divinyldimethoxysilane, divinyldiethoxysilane, trivinylmethoxysilane and trivinylethoxysilane. The alkoxysilane compound may be used singly or in combination of two or more.

In the above process, where necessary, an aluminum compound such as aluminum chloride and a trialkoxyaluminum may be added in a suitable amount.

As another process, using sodium meta-silicate, sodium ortho-silicate or water glass (a mixture of sodium silicates) as the silicon compound of the raw material, the silicon compound may be hydrolyzed with an acid such as hydrochloric acid, sulfuric acid and nitric acid or a metal compound such as magnesium chloride and calcium sulfate. Free silicic acid is formed by the hydrolysis. This compound is easily polymerized and a mixture of linear compounds, cyclic compounds and network compounds is obtained although the composition is different depending on the type of the material. Polysilicic acid obtained from water glass contains as the major components compounds having linear structures represented by general formula [2]:

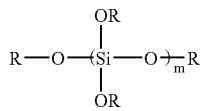

[2]

wherein m represents the degree of polymerization, and R represents hydrogen atom, silicon atom or a metal atom such as magnesium atom and aluminum atom.

Completely inorganic silica-based compounds can be obtained as described above. As the inorganic silica-based compound, silica gel ($SiO_x \cdot nH_2O$) can also be used.

Layer (B) may comprise a silicone-based block copolymer in combination with the porous silica and the siloxane-based polymer, where necessary. Since the antifouling property can be provided to layer (B) by the silicone-based block copolymer comprised in layer (B), the film for optical applications of the present invention exhibits the excellent antifouling property. When the silicone-based block copolymer is not comprised, in general, an antifouling layer is additionally formed on layer (B) when the antifouling property is required for the film for optical applications.

Examples of the silicone-based block copolymer include block copolymers of the A-B type comprising segment A which is a (co)polymer obtained from a monomer formed by bonding a radical polymerizable functional group to at least one chain end of a polyorganosiloxane and segment B which is a (co)polymer obtained from a radical polymerizable monomer such as a (meth)acrylic ester. The solubility into organic solvents and the dispersion property into aqueous media can be provided to the obtained block copolymer of the A-B type by suitably selecting the radical polymerizable functional group bonded to at least one chain end of a polyorganosiloxane forming segment A and the radical polymerizable monomer forming segment B.

When layer (B) comprises the silicone-based block copolymer, the content of the silicone-based block copolymer in layer (B) is selected, in general, in the range of 2 to 50% by weight. When the content is smaller than 2% by weight, there is the possibility that the effect of providing the antifouling property is not sufficiently exhibited. When the content exceeds 50% by weight, there is the possibility that layer (B) having the desired refractive index is not obtained. It is preferable that the content of the silicone-based block copolymer is 5 to 40% by weight and more preferably 10 to 30% by weight.

In the present invention, the low refractivity layer of layer (B) can be formed by applying a coating fluid comprising the porous silica, the siloxane-based polymer which may be a precursor thereof and the silicone-based block copolymer which is used where desired to the high refractivity hard coat layer of layer (A) in accordance with a conventional process such as the bar coating process, the knife coating process, the roll coating process, the blade coating process, the die coating process and the gravure coating process to form a coating layer, followed by a treatment of heating at a temperature of about 80 to 150° C.

When the siloxane-based polymer in the low refractivity layer comprising the porous silica, the siloxane-based polymer and, where necessary, the silicone-based block copolymer which is formed as described above has silanol group or other hydrophilic groups, the antistatic property is provided, and the attachment of dusts to the obtained film for optical applications is suppressed. Therefore, the above low refractivity layer is preferable.

In the film for optical applications of the present invention, when layer (B) does not comprise the silicon-based block copolymer, (C) an antifouling layer may be formed on layer (B), where desired. The antifouling layer can be formed by applying a coating fluid comprising a fluororesin to the low refractivity layer of layer (B) in accordance with a conventional process such as the bar coating process, the knife coating process, the roll coating process, the blade coating process, the die coating process and the gravure coating process to form a coating layer, followed by a drying treatment.

The thickness of the antifouling coating layer is, in general, in the range of 1 to 10 nm and preferably in the range of 3 to 8 nm. By disposing the antifouling layer, the surface of the obtained film for optical applications is provided with an improved slipping property and fouling of the surface is suppressed.

In the film for optical applications of the present invention, when the high refractivity hard coat film is disposed on one face of the substrate film, an adhesive layer for adhering the film for optical applications to an adherend such as a liquid display device may be formed on the face of the substrate film opposite to the face having the hard coat layer. As the adhesive constituting the adhesive layer, an adhesive for optical applications such as an acrylic adhesive, a urethane adhesive and a silicone adhesive can be preferably used. The thickness of the adhesive layer is, in general, in the range of 5 to 100 μm and preferably in the range of 10 to 60 μm.

A release film may be disposed on the adhesive layer. Examples of the release film include release films prepared by coating paper such as glassine paper, coated paper and laminate paper or a plastic film with a release agent such as a silicone resin. The thickness of the release film is not particularly limited. In general, the thickness of the release film is in the range of about 20 to 150 μm. It is preferable that the total light transmittance of the film for optical applications of the present invention is 85% or greater and more preferably 90% or greater.

EXAMPLES

The present invention will be described more specifically with reference to examples in the following. However, the present invention is not limited to the examples.

The physical properties of the film for optical applications obtained in Examples and Comparative Examples were measured in accordance with the following methods.

(1) Light Reflectance at Wavelength of 550 nm

The light reflectance at the wavelength of 550 nm was measured using a spectrophotometer [manufactured by SHIMADZU SEISAKUSHO Co., Ltd.; "UV-3101PC"].

(2) Total Light Transmittance

The total light transmittance was measured using a haze meter manufactured by NIPPON DENSHOKU Co., Ltd. "NDH-2000".

(3) Scratch Resistance

The surface of a low refractivity layer was rubbed with steel wool #0000 under a load of $9.8 \times 10^{-3}$ N/mm$^2$ in five reciprocal movements, and the condition of the surface was visually observed. The result was evaluated in accordance with the following criterion:
  good: No scratches were found on the surface.
  poor: Scratches were found on the surface.

(4) Antiglare Property (60° Gloss)

The 60° gloss was measured in accordance with the method of Japanese Industrial Standard K 7105 using a gloss meter manufactured by NIPPON DENSHOKU Co., Ltd.

(5) Antifouling Property (Contact Angle with Water)

Under the environment of a temperature of 23° C. and a relative humidity of 50%, a droplet of 10 μl of purified water was placed on the surface of a low refractivity layer, and the contact angle between the surface of the low refractivity layer and the purified water was measured after one minute using a contact angle meter [manufactured by KYOWA KAIMEN KAGAKU Co., Ltd.; "CA-X type"].

(6) Antistatic Property

A film for optical applications was left standing in a room for one month. Attachment of dusts was examined by observation, and the result was evaluated in accordance with the following criterion:
  good: No dusts were attached.
  poor: Dusts were attached.

(7) Refractive Index

The refractive index was measured using an Abbe refractometer manufactured by ATAGO Co., Ltd.

Example 1

(1) A polyethylene terephthalate (PET) film having a thickness of 188 μm [manufactured by TOYOBO Co., Ltd.; the trade name: A4100] which had a coating layer for enhancing adhesion was used as the substrate film. The face of the substrate film having the coating layer for enhancing adhesion was coated with a coating fluid for forming a hard coat layer prepared by mixing 100 parts by weight of an acrylic hard coating material of the ultraviolet light curing type containing a photopolymerization initiator and zirconium oxide (a compound curable with an ionizing radiation) [manufactured by JSR Co., Ltd.; the trade name: "DESOLITE KZ7252C"; the concentration of solid components: 46% by weight; the content of zirconium oxide in the entire solid components: 68% by weight], 46 parts by weight of an acrylic hard coating material containing a photopolymerization initiator (a compound curable with an ionizing radiation) [manufactured by ARAKAWA KAGAKU Co., Ltd.; the trade name: "BEAMSET 575CB"; the concentration of the solid components: 100% by weight] and 310 parts by weight of a toluene dispersion of ATO having a needle shape [manufactured by ISHIHARA TECHNO Co., Ltd.; the trade name: "FSS-10T"; the concentration of solid components: 30% by weight; the shape of ATO: an average particle diameter along the major axis of 0.23 μm, an average particle diameter along the minor axis of 0.015 μm and an average aspect ratio of about 15] using a Mayer bar No. 12 in a manner such that the thickness of the film after being completely cured was 5 μm. After the formed layer was dried at 80° C. for 3 minute, the layer was cured by irradiation with ultraviolet light in an amount of light of 500 mJ/cm$^2$, and a high refractivity hard coat layer having refractive index of 1.66 was formed. The content of the entire metal oxides (zirconium oxide and ATO) in the obtained high refractivity hard coat layer was about 67% by weight, and the ratio of the amount by weight of ATO to the amount by weight of zirconium oxide was 3:1.

(2) A siloxane-based polymer (an antistatic agent) [manufactured by COLCOAT Co., Ltd.; the trade name: COLCOAT P; the concentration of solid components: 2% by weight] in an amount of 100 parts by weight, 30 parts by weight of a dispersion of porous silica (the specific gravity: 1.8 to 1.9; the refractive index: 1.34 to 1.36; the average particle diameter: about 50 nm) in a solvent [manufactured by SHOKUBAI KASEI KOGYO Co., Ltd.; the trade name: "ELCOM P-special product 3"; the concentration of solid components: 10% by weight] and 15 parts by weight of a silicone-based block copolymer [manufactured by NIPPON YUSHI Co., Ltd.; the trade name: "MODIPER FS20""; the concentration of solid components: 15% by weight] were mixed together. The resultant mixture was diluted with isobutyl alcohol so that the concentration of solid components in the entire mixture was adjusted at 2% by weight, and a coating fluid was prepared.

The hard coat layer formed in step (1) described above was coated with the coating fluid prepared above using a Mayer bar No. 4 in a manner such that the thickness of the film after the heat treatment was 100 nm. The formed layer was treated by heating at 130° C. for 2 minute, and a low refractivity layer containing the porous silica, the silicone-based block copolymer and the siloxane-based polymer and having a refractive index of 1.40 was formed.

The physical properties of the prepared film for optical applications are shown in Table 1.

Example 2

A film for optical applications was prepared in accordance with the same procedures as those conducted in Example 1 except that, in the formation of the high refractivity hard coat layer described in Example 1, the amount of the acrylic hard coating material containing a photopolymerization initiator (the compound curable with an ionizing radiation) "BEAMSET 575CB" in the coating fluid for forming the hard coat layer was changed to 23 parts by weight, and the amount of the toluene dispersion of ATO having a needle shape "FSS-10T" (described above) was changed to 200 parts by weight. The content of the entire metal oxides in the high refractivity layer of the obtained film for optical applications was about 70% by weight, and the ratio of the amount by weight of ATO to the amount by weight of zirconium oxide was about 2:1.

The physical properties of the prepared film for optical applications are shown in Table 1.

Example 3

A film for optical applications was prepared in accordance with the same procedures as those conducted in Example 1 except that, in the formation of the high refractivity hard coat layer described in Example 1, a coating fluid for forming the hard coat layer was prepared by mixing 100 parts by weight of an acrylic hard coat material containing a photopolymerization initiator [manufactured by DAINICHI SEIKA KOGYO Co., Ltd.; the trade name: SEIKA BEAM EXF-01L(NS); the concentration of solid components: 100%], 100 parts by weight of a dispersion of zinc antimonate [manufactured by NISSAN KAGAKU KOGYO Co., Ltd.; the trade name: "CELNAX CX-Z610M-FA"; the concentration of solid components: 60% by weight] and 500 parts by weight of a toluene dispersion of ATO "FSS-10T" (described above). The content of the entire metal oxides in the high refractivity hard coat layer of the obtained film for optical applications was about 68% by weight, and the ratio of the amount by weight of ATO to the amount by weight of zirconium oxide was 2.5:1.

The physical properties of the prepared film for optical applications are shown in Table 1.

Example 4

A film for optical applications was prepared in accordance with the same procedures as those conducted in Example 1 except that, in the formation of the high refractivity hard coat layer described in Example 1, 25 parts by weight of an acrylic hard coat material containing an initiator and silica gel (a compound curable with an ionizing radiation) [manufactured by DAINICHI SEIKA KOGYO Co., Ltd.; the trade name: SEIKA BEAM EXF-01L(BS); the concentration of solid components: 100%; the content of silica gel: 10% by weight; the average particle diameter of silica gel: 1.5 μm] was further added to the coating fluid for forming the hard coat layer. The content of the entire metal oxides in the obtained high refractivity hard coat layer of the film for optical applications was about 60% by weight, and the ratio of the amount by weight of ATO to the amount by weight of other metal oxides (zirconium oxide and silica gel) was about 2.75:1.

The physical properties of the prepared film for optical applications are shown in Table 1.

Comparative Example 1

A film for optical applications was prepared in accordance with the same procedures as those conducted in Example 1 except that the toluene dispersion of ATO having a needle shape "FSS-10T" (described above) was replaced with a dispersion of ATO having a spherical shape (the average particle diameter: 100 nm) in methyl ethyl ketone [manufactured by ISHIHARA TECHNO Co., Ltd.; the trade name: "SN-100P(MEK)"; the concentration of solid components: 30% by weight].

The physical properties of the prepared film for optical applications are shown in Table 1.

TABLE 1

| | Refractive index of high refractivity hard coat layer | Light Reflectance at 550 nm (%) | Total light transmittance (%) | Steel wool hardness | Anti-glare property [60° gloss] | Anti-fouling property [contact angle with water] (degree) | Antistatic property |
|---|---|---|---|---|---|---|---|
| Example 1 | 1.66 | 1.2 | 94.7 | good | 155 | 97 | good |
| Example 2 | 1.68 | 1.4 | 94.0 | good | 157 | 98 | good |
| Example 3 | 1.65 | 1.7 | 93.8 | good | 154 | 97 | good |
| Example 4 | 1.63 | 1.8 | 93.7 | good | 80 | 99 | good |
| Comparative Example 1 | 1.67 | 1.3 | 83.4 | good | 155 | 98 | good |

INDUSTRIAL APPLICABILITY

In accordance with the present invention, a film for optical applications which effectively prevents reflection of light on the surface of image display devices such as PDP, CRT and LCD, exhibits excellent scratch resistance and transmission of light, provides excellent adhesion between layers and can be produced at a low cost can be provided.

The invention claimed is:

1. A film for optical applications comprising (A) a high refractivity hard coat layer which comprises (a) an antimony-doped tin oxide having a needle shape having an average particle diameter along a major axis of 0.05 to 10 μm and an average aspect ratio of 3 to 100, (b) at least one other metal oxide and (c) a material cured with an ionizing radiation and has a refractive index in a range of 1.60 to 1.75 and a thickness in a range of 2 to 20 μm and (B) a low refractivity layer which has a refractive index in a range of 1.30 to 1.45 and a thickness in a range of 40 to 200 nm, layers (A) and (B) being successively laminated at least on one face of a substrate film.

2. A film for optical applications according to claim 1, wherein the other metal oxide of component (b) in layer (A) is at least one metal oxide selected from zirconium oxide, zinc antimonate and antimony pentaoxide.

3. A film for optical applications according to claim 1, wherein a content of entire metal oxides in layer (A) is 50 to 80% by weight, and a ratio of an amount by weight of component (a) to an amount by weight of component (b) is 4:1 to 1:3.

4. A film for optical applications according to claim 1, wherein layer (B) comprises porous silica and a siloxane-based polymer.

5. A film for optical applications according to claim 4, wherein layer (B) further comprises a silicone-based block copolymer.

6. A film for optical applications according to claim 4, wherein the porous silica in layer (B) has a specific gravity of 1.7 to 1.9, a refractive index of 1.30 to 1.36 and an average particle diameter of 20 to 100 nm.

7. A film for optical applications according to claim 5, wherein a content of the silicone-based block copolymer in layer (B) is 2 to 50% by weight.

8. A film for optical applications according to claim 1, wherein the hard coat layer of layer (A) is a hard coat layer having an antiglare property.

9. A film for optical applications according to claim 1, wherein the low refractivity layer of layer (B) has an antistatic property.

* * * * *

UNITED STATES PATENT AND TRADEMARK OFFICE
CERTIFICATE OF CORRECTION

PATENT NO. : 7,119,959 B2 Page 1 of 1
APPLICATION NO. : 10/549044
DATED : October 10, 2006
INVENTOR(S) : Shoshi et al.

It is certified that error appears in the above-identified patent and that said Letters Patent is hereby corrected as shown below:

Title Page, Left Column, (22) PCT Filed: Replace "Mar. 28, 2004" with -- Mar. 26, 2004 --.

Signed and Sealed this

Thirteenth Day of March, 2007

JON W. DUDAS
*Director of the United States Patent and Trademark Office*